(12) United States Patent
Sugimoto

(10) Patent No.: US 10,498,918 B2
(45) Date of Patent: Dec. 3, 2019

(54) INSTALLATION SYSTEM AND RECORDING MEDIUM SUITABLE FOR MANAGEMENT OF REMOTE OPERATION APPLICATION OF IMAGE FORMING APPARATUS

(71) Applicant: KYOCERA Document Solutions Inc., Osaka (JP)

(72) Inventor: Kensaku Sugimoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/185,351

(22) Filed: Nov. 9, 2018

(65) Prior Publication Data

US 2019/0182401 A1 Jun. 13, 2019

(30) Foreign Application Priority Data

Dec. 12, 2017 (JP) .................................. 2017-237745

(51) Int. Cl.
*G06F 15/00* (2006.01)
*G06F 3/12* (2006.01)
*G06K 1/00* (2006.01)
*H04N 1/00* (2006.01)
*H04B 17/318* (2015.01)

(52) U.S. Cl.
CPC ....... *H04N 1/00973* (2013.01); *H04B 17/318* (2015.01); *H04N 1/00307* (2013.01)

(58) Field of Classification Search
CPC ........... H04N 1/00973; H04N 1/00307; H04B 17/318

USPC .............................. 358/1.15, 1.14, 1.13, 1.1
See application file for complete search history.

(56) References Cited

U.S. PATENT DOCUMENTS

2018/0083795 A1* 3/2018 Zehler .................. H04W 76/10
2018/0249517 A1* 8/2018 Park ..................... H04W 76/11
2019/0130750 A1* 5/2019 Cole ................... G06Q 20/0457

FOREIGN PATENT DOCUMENTS

JP 2015-035828 A 2/2015

* cited by examiner

*Primary Examiner* — Douglas Q Tran
(74) *Attorney, Agent, or Firm* — Hawaii Patent Services; Nathaniel K. Fedde; Kenton N. Fedde

(57) ABSTRACT

Provided is an installation system that easily performs management of a remote operation application. An MFP (electronic apparatus) transmits radio waves at a fixed output. A portable terminal receives the radio waves and confirms whether or not a remote operation application corresponding to the MFP (electronic apparatus) is installed in accordance with a change in strength of the radio waves according to a distance to the MFP (electronic apparatus), and in the case where the remote operation application is not installed, downloads a remote operation application corresponding to the MFP (electronic apparatus). As a result, it is possible to automatically download a remote operation application corresponding to the MFP (electronic apparatus) in accordance with a change in the strength of the radio waves according to the distance to the MFP (electronic apparatus), and unconsciously update the remote operation application.

3 Claims, 4 Drawing Sheets

INSTALLATION SYSTEM AND RECORDING MEDIUM SUITABLE FOR MANAGEMENT OF REMOTE OPERATION APPLICATION OF IMAGE FORMING APPARATUS

INCORPORATION BY REFERENCE

This application is based on and claims the benefit of priority from Japanese Patent Application No. 2017-237745 filed on Dec. 12, 2017, the contents of which are hereby incorporated by reference.

BACKGROUND

The present disclosure relates to an installation system and a recording medium suitable for management of a remote operation application of an image forming apparatus.

In an image forming apparatus, in addition to a printing function, a copying function, a FAX function, a data transmitting/receiving function via a network, there are models having a wireless communication function for exchanging data with a portable terminal such as a smartphone or the like. An image forming apparatus is, for example, a multifunction printer, multifunction peripheral (MFP), or the like. Moreover, of this kind of image forming apparatus, from the viewpoint of the prevention of leakage of confidential information and the like, there are also models equipped with a function for performing user authentication in a login process. Incidentally, in user authentication, it is necessary to input authentication information such as a user identification (ID), a password, or the like.

In addition, in this kind of image forming apparatus, by setting a power-saving mode, in the case where the user does not use the image forming apparatus for a certain period of time, the mode switches from a normal mode to a sleep mode or a power-OFF mode, so power consumption can be suppressed as well. Incidentally, in the case of using an image forming apparatus that has switched to the power OFF mode, for example, the panel unit is used to give an instruction to switch to the normal mode; however, in the case of performing printing or copying, the user will wait until the temperature of a fixing unit reaches a specified value.

In order to solve such inconvenience, for example, it is conceivable to apply a detection method in a power-supply-control apparatus having the following typical technology. In other words, in this power-supply-control apparatus, a power-supply-state-transition-control means causes a plurality of operated units to transition to a plurality of power-supply states having different power consumption. A first moving-object-detecting means detects whether or not a moving object has entered a first-detection range. A second moving-object-detecting means detects whether or not a moving object has entered a range narrower than the first-detection range. Then, in the case where the first moving-object-detecting means detects a moving object, a power-supply-state-transition-controlling means causes an image-forming unit among the operated units to transition to a power-supply state. In the case where a second moving-body-detecting means detects a moving body that has entered a range narrower than the first detection range, a display unit among the operated units is switched to a power-supply state.

SUMMARY

The installation system according to the present disclosure includes an electronic apparatus and a portable terminal. The electronic apparatus transmits radio waves at a fixed output. The portable terminal receives the radio waves and confirms whether or not a remote operation application corresponding to the electronic apparatus is installed in accordance with a change in strength of the radio waves according to a distance to the electronic apparatus, and in the case where the remote operation application is not installed, downloads a remote operation application corresponding to the electronic apparatus.

The recording medium according to the present disclosure is a non-transitory computer-readable recording medium that stores an executable installation program in a computer that controls an installation system. When executing the installation program, the computer, by an electronic apparatus, transmits radio waves at a fixed output. Then, the computer, by a portable terminal, receives the radio waves and confirms whether or not a remote operation application corresponding to the electronic apparatus is installed in accordance with a change in strength of the radio waves according to a distance to the electronic apparatus, and in the case where the remote operation application is not installed, downloads a remote operation application corresponding to the electronic apparatus.

DETAILED DESCRIPTION

Hereinafter, an embodiment of the installation system according to the present disclosure will be described with reference to FIG. 1 to FIG. 4. Examples of electronic apparatuses in the following description include a multifunction peripheral (MFP), which is a complex peripheral apparatus equipped with a printing function, a copying function, a FAX function, a data transmitting/receiving function via a network, and the like.

Figure 1:
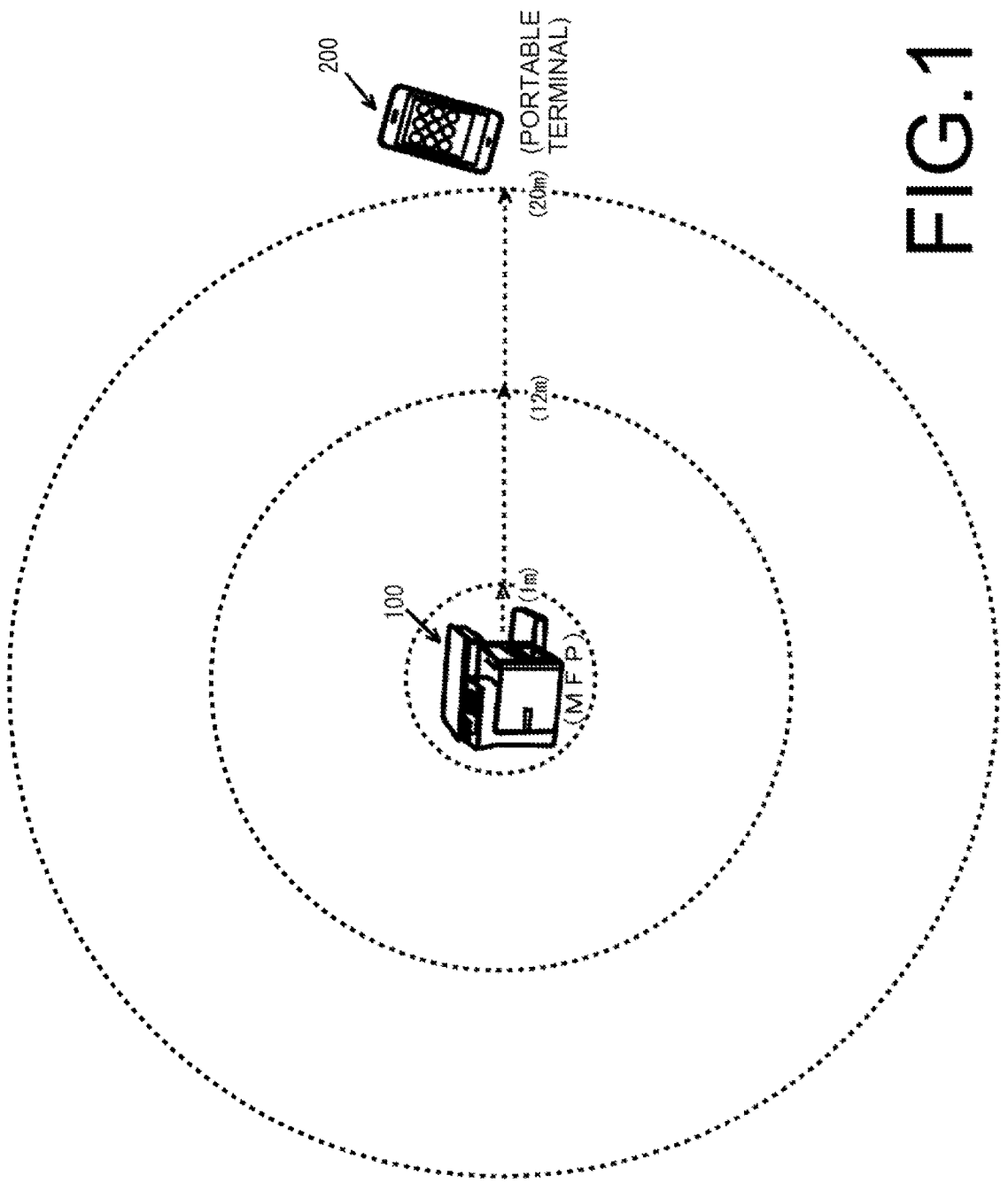
FIG. 1 is a diagram for explaining an embodiment of an installation system according to the present disclosure.

First, as illustrated in FIG. 1, the installation system includes an MFP 100 and a portable terminal 200. As will be described in detail later, the MFP 100 transmits an Internet protocol (IP) address and Bluetooth Low Energy (registered trademark) (BLE: hereinafter referred to as a beacon signal). The beacon signal includes access information such as a uniform resource locator (URL) or the like. Incidentally, the IP address is access information for the MFP 100, and the URL is access information of a Web page that will download a remote operation application to be described later.

As will be described in detail later, it is presumed that a wireless communication application (hereinafter referred to as a wireless communication app) enabling wireless communication with the MFP 100 is installed in the portable terminal 200. Incidentally, as the wireless communication, any one of communication methods such as Wi-Fi (registered trademark), Wi-Fi Direct (registered trademark), near-field communication Bluetooth (registered trademark), and the like of a wireless local area network (LAN) can be used. In addition, as will be described in detail later, after receiving a beacon signal from the MFP 100, the portable terminal 200 confirms whether a remote operation application (hereinafter referred to as a remote operation app) capable of remotely operating the MFP 100 is installed. When the remote operation app is not installed, the portable terminal 200 downloads the remote operation app from the Web page indicated by the URL included in the beacon signal and further installs it.

Here, as will be described later, when the distance from the MFP 100 reaches, for example, about 20 m, the wireless communication app acquires the device information of the MFP 100, and the portable terminal 200 confirms whether a remote operation app that remotely operates the MFP 100 is installed. Note that the device information is acquired in order to confirm whether or not the remote operation app installed in the mobile terminal 200 conforms to the model of the MFP 100, the version of the firmware, and the like. Incidentally, in the case where the installed remote operation app conforms to the model of the MFP 100, the version of the firmware, and the like, it can be confirmed that there will be no problem during use.

Moreover, a case where the remote operation app for remotely operating the MFP 100 is not installed in the portable terminal 200 will be described. When the distance from the MFP 100 reaches, for example, about 12 m, the portable terminal 200 downloads the remote operation app from a Web page indicated by the URL acquired from the MFP 100 and further installs the app. Moreover, after the remote operation app is installed, the portable terminal 200 causes the panel unit 202 illustrated in FIG. 2 described later to display contents prompting setting of function selection or the like of the MFP 100, and accepts the setting contents. Furthermore, after the distance from the MFP 100 reaches, for example, about 1 m, the portable terminal 200 transmits the setting contents received via the panel unit 202 to the MFP 100. Note that the distance from the MFP 100 is not limited to 20 m, 12 m, and 1 m as described above, and can be arbitrarily set according to the installation environment of the MFP 100.

Figure 2:
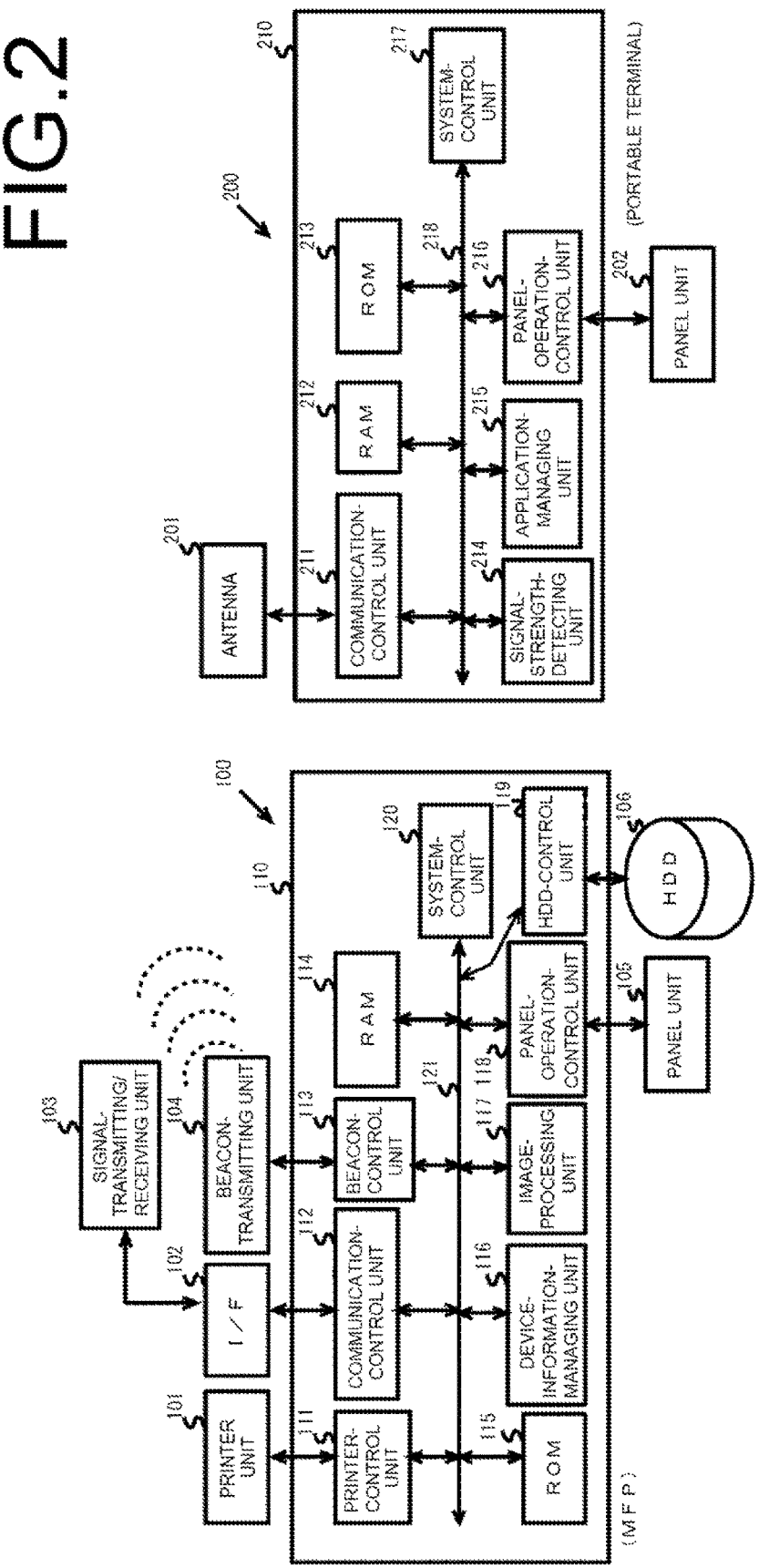
FIG. 2 is a diagram for explaining an example of a configuration of the MFP and the portable terminal in FIG. 1.

Next, an example of the configuration of the MFP 100 and portable terminal 200 will be described with reference to FIG. 2. First, the MFP 100 includes a control unit 110 that controls a printer unit 101, an I/F (interface) 102, a signal-transmitting/receiving unit 103, a beacon-transmitting unit 104, a panel unit 105, and a HDD 106. Incidentally, the MFP 100 may include a scanner unit, a FAX unit, and the like.

The printer unit 101 is a device that prints an image on paper based on printing data outputted from the control unit 110. The I/F 102 is in charge of communication with the portable terminal 200 via the signal-transmitting/receiving unit 103. Note that the communication method of the I/F 102 may be Wi-Fi (registered trademark), Wi-Fi Direct (registered trademark), near-field communication Bluetooth (registered trademark), or the like of a wireless LAN. In addition, the I/F 102 may be in charge of communication with a content server, a web server, or the like via a network.

The beacon-transmission unit 104 transmits a beacon signal at fixed intervals (for example, at intervals of one second) and at a fixed output. The panel unit 105 is a device such as a touch panel or the like that performs a printing function, a copying function, a FAX function, a data transmitting/receiving function via a network, and a display for various settings of the MFP 100. The HDD 106 is a storage device that stores application programs and the like for providing various functions of the MFP 100. In addition, the HDD 106 also has a user box for storing printing jobs registered from the portable terminal 200 or a user terminal, for example.

The control unit 110 is a processor that controls the overall operation of the MFP 100 by executing an image forming program, a control program, and the like. The control unit 110 includes a printer-control unit 111, a communication-control unit 112, a beacon-control unit 113, a random access memory (RAM) 114, a read-only memory (ROM) 115, a device-information-managing unit 116, an image-processing unit 117, a panel-operation-control unit 118, an HDD-control unit 119, and a system-control unit 120. In addition, these units are connected to a data bus 121. The printer-control unit 111 controls printing operation of the printer unit 101. The communication-control unit 112 performs control of transmission and reception of data and the like to and from the portable terminal 200 via the I/F 102 and the signal-transmitting/receiving unit 103. In addition, the communication-control unit 112, via the I/F 102, performs control of transmission and reception of data and the like via a network.

The beacon-control unit 113 controls the transmission operation of beacon signals of the beacon-transmitting unit 104. In this case, the beacon-control unit 113 controls the beacon-transmitting unit 104 so as to transmit at fixed intervals interval (for example, at intervals of one second) and at a fixed output. The RAM 114 is a work memory for executing a program. The ROM 115 stores a control program for performing operation checks and the like of each unit. The device-information-managing unit 116 manages, as device information, basic function information and additional function information of functions installed in the MFP 100, firmware version information of each function, and the like. The image-processing unit 117, for example, performs image processing (rasterizing) on a printing job registered in a user box of the HDD 106. Note that the system-control unit 120 temporarily stores printing data that has undergone image processing by the image-processing unit 117 in the RAM 114.

The panel-operation-control unit 118 controls the display operation of the panel unit 105. In addition, the panel-operation-control unit 118, via the panel unit 105, receives settings and the like for the start of printing, copying, FAX, data transmission/reception, and the like. The HDD-control unit 119 controls reading and writing of data to and from the HDD 106, and the like. The system-control unit 120 controls the cooperative operation of each unit. Moreover, upon receiving, for example, a printing instruction from the panel unit 105 or from the portable terminal 200, the system-control unit 120 issues an image-processing instruction to the image-processing unit 117, and issues a printing instruction to the printer-control unit 111 to perform printing by the printer unit 101, and the like. Furthermore, as will be described in detail later, the system-control unit 120, in accordance with a remote instruction from the portable terminal 200 based on a remote operation app, causes any one of a printing function, a copying function, a FAX function, a scanner function, a data transmitting/receiving function via a network to be executed.

The portable terminal 200 includes an antenna 201 and a control unit 210 for controlling the panel unit 202. The antenna 201 transmits and receives radio waves to and from a wireless base station. In addition, the antenna 201 receives a beacon signal transmitted by the MFP 100. Moreover, the antenna 201 transmits and receives radio waves used for wireless communication to and from the MFP 100. In other words, in the case where the communication method is Wi-Fi (registered trademark), the antenna 201 transmits and receives radio waves to and from the MFP 100 via a wireless LAN router. Furthermore, in the case where the communication method is P2P (Peer to Peer) (for example, Wi-Fi Direct (registered trademark), Bluetooth (registered trademark)), the antenna 201 transmits and receives radio waves to and from the signal-transmitting/receiving unit 103 of the MFP 100.

The control unit 210 is a processor that controls the overall operation of the portable terminal 200 by executing a control program and the like. The control unit 210 includes a communication-control unit 211, a RAM 212, a ROM 213, a signal-strength detecting unit 214, an application-managing unit 215, a panel-operation-control unit 216, and a system-control unit 217. In addition, these units are connected to a data bus 218.

The communication-control unit 211, via the antenna 201, performs control of transmission and reception of data and the like to and from the MFP 100. In addition, the communication-control unit 211, via the antenna 201, performs control of transmission and reception of data and the like via network. The RAM 212 is a work memory for executing a program. The ROM 213 stores a control program for performing operation checks and the like of each unit. The signal-strength-detecting unit 214 detects the strength (dBm) of the beacon signal transmitted from the MFP 100. The application-managing unit 215 manages various applications installed in the portable terminal 200. The panel-operation control unit 216 controls the display operation of the panel unit 202.

The system-control unit 217 controls the cooperative operation of each unit. In addition, although the details will be described later, the system-control unit 217 obtains the distance from the MFP 100 based on the strength (dBm) of the beacon signal detected by the signal-strength-detecting unit 214. Then, every time the set distance is reached, the system-control unit 217 sequentially executes confirmation as to whether or not a remote operation app for remotely operating the MFP 100 is installed, downloading of a remote operation app, and transmission of setting contents, and the like.

Figure 3:
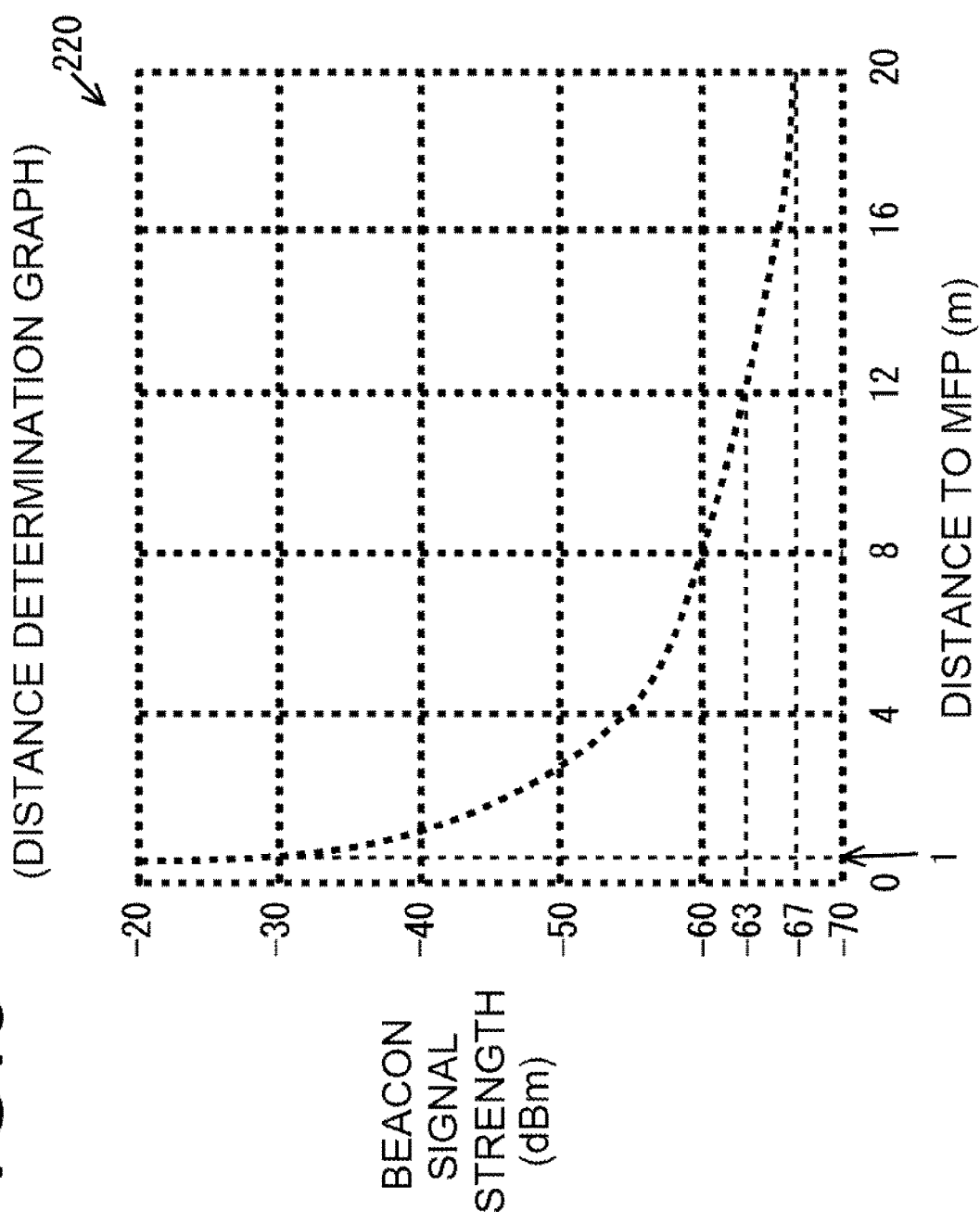
FIG. 3 is a diagram illustrating an example of a distance determination graph referred to when a system-control unit of the portable terminal in FIG. 2 determines the distance to the MFP.

Next, referring to FIG. 3, an example of a distance determination graph that is referred to when the system-control unit 217 of the portable terminal 200 determines the distance to the MFP 100 will be described. In other words, the strength (dBm) of the beacon signal transmitted by the MFP 100 is attenuated in inverse proportion to the square of the distance. Here, in the case where the signal-strength-detecting unit 214 detects the strength (dBm) of the beacon signal as, for example, −67 dBm (0.00000001 mW), the system-control unit 217, from the distance determination graph 220, determines that the distance to the MFP 100 is, for example, 20 m. In addition, in the case where the signal-strength-detecting unit 214 detects the strength (dBm) of the beacon signal as, for example, −63 dBm (0.00000005 mW), the system-control unit 217, from the distance determination graph 220, determines that the distance to the MFP 100 is, for example, 12 m. Moreover, in the case where the signal-strength-detecting unit 214 detects the strength (dBm) of the beacon signal as, for example, −30 dBm (0.001 mW), the system-control unit 217, from the distance determination graph 220, determines that the distance to the MFP 100 is, for example, 1 m.

Next, with reference to FIG. 4, a process such as installing a remote operation app or the like on the portable terminal 200 side will be described. Incidentally, in the following description, the level in the case where the strength (dBm) of the beacon signal detected by the signal-strength-detecting unit 214 is, for example, not less than −67 dBm (0.00000001 mW) and less than −63 dBm (0.00000005 mW) is set as a first level. The level when the strength (dBm) of the beacon signal detected by the signal-strength-detecting unit 214 is, for example, not less than −63 dBm (0.00000005 mW) and less than −30 dBm (0.001 mW) is set as a second level. The level when the strength (dBm) of the beacon signal detected by the signal-strength-detecting unit 214 is, for example, equal to or greater than −30 dBm (0.001 mW) is set as a third level. Moreover, in the following description, the case is presumed, for example, in which printing data is transmitted from the portable terminal 200 to the MFP 100 while the user is moving to the MFP 100 side, and a printing instruction is issued from the portable terminal 200 to the MFP 100.

(Step S101)

The system-control unit 217 determines whether or not a beacon signal has been received.

In this case, when no notification has been received from the communication-control unit 211 informing that a beacon signal has been received, the system-control unit 217 determines that a beacon signal has not been received (step S101: NO).

On the other hand, when a notification has been received from the communication-control unit 211 informing that a beacon signal has been received, the system-control unit 217 determines that a beacon signal has been received (step S101: YES), and the process moves to step S102.

(Step S102)

The system-control unit 217 causes the beacon signal strength (dBm) to be detected.

In this case, the system-control unit 217 causes the signal-strength-detecting unit 214 to detect the strength (dBm) of the beacon signal.

At this time, the signal-strength-detecting unit 214 detects the strength (dBm) of the beacon signal transmitted from the MFP 100 at fixed intervals (for example, at intervals of one second) at fixed intervals (for example, at intervals of one second), and notifies the system-control unit 217.

(Step S103)

The system-control unit 217 determines whether or not a detection result has been received.

In this case, when the system-control unit 217 has not received the strength (dBm) of the beacon signal detected by the signal-strength-detecting unit 214, the system-control unit 217 determines that the detection result has not been received (step S103: NO).

On the other hand, when the system-control unit 217 has received the strength (dBm) of the beacon signal detected by the signal-strength-detecting unit 214, the system-control unit 217 determines that the detection result has been received (step S103: YES), and the process moves to step S104.

At this time, the system-control unit 217 acquires access information such as the IP address, the URL, or the like included in the beacon signal.

In addition, the system-control unit 217 activates the wireless communication app.

(Step S104)

The system-control unit 217 determines whether or not the strength (dBm) of the beacon signal detected by the signal-strength detecting unit 214 is at the first level.

In this case, the system-control unit 217 checks the strength (dBm) of the beacon signal detected by the signal-strength-detecting unit 214. Then, for example, in the case where the strength is less than −67 dBm (0.00000001 mW), it is determined that the strength is not at the first level (step S104: NO).

On the other hand, the system-control unit 217 checks the strength (dBm) of the beacon signal detected by the signal-strength-detecting unit 214. Then, for example, when the strength is not less than −67 dBm (0.00000001 mW) and less than −63 dBm (0.00000005 mW), it is determined that the strength is at the first level (step S104: YES), and the process moves to step S105.
(Step S105)

The system-control unit 217 requests the MFP 100 to transmit device information.

In this case, the system-control unit 217 instructs the communication-control unit 211 to transmit device information based on the IP address acquired from the beacon signal in accordance with the procedure of the activated wireless communication app.

At this time, the communication-control unit 211, by wireless communication via the antenna 201, requests the MFP 100 to transmit the device information.

On the MFP 100 side, when the communication-control unit 112 receives the request via the signal transmitting/receiving unit 103 for transmitting the device information, the system-control unit 120 reads the device information managed by the device-information-managing unit 116, and transmits the device information via the communication-control unit 112 and signal-transmitting/receiving unit 103.

Incidentally, after receiving the request for transmitting the device information, the MFP 100 side may receive authentication information such as the user ID (identification), password and the like from the portable terminal 200, and perform user authentication in the login process.
(Step S106)

The system-control unit 217 determines whether or not the device information has been received from the MFP 100.

In this case, when there is no notification from the communication-control unit 211 indicating that the device information has been received, the system control unit 217 determines that the device information from the MFP 100 has not been received (step S106: NO).

On the other hand, when there is a notification from the communication-control unit 211 indicating that the device information has been received, the system control unit 217 determines that the device information from the MFP 100 has been received (step S106: YES), and the process moves to step S107.
(Step S107)

The system-control unit 217 determines whether or not a remote operation app has been installed.

In this case, the system-control unit 217 confirms whether or not there is a remote operation app corresponding to the device information received from the MFP 100 in the various installed applications that are managed by the application-managing unit 215. Then, in the case where there is a remote operation app, the system-control unit 217 determines that the remote operation app has already been installed (step S107: YES), and the process moves to step S108.

On the other hand, the system control unit 217 confirms whether or not there is a remote operation app corresponding to the device information received from the MFP 100 in the various installed applications managed by the application-managing unit 215. Then, in the case where there is no remote operation app, the system-control unit 217 determines that the remote operation app has not been installed (step S107: NO), and the process moves to step S109.

(Step S108)

The system control unit 217 determines whether or not the strength (dBm) of the beacon signal detected by the signal-strength-detecting unit 214 is at the second level.

In this case, the system-control unit 217 checks the strength (dBm) of the beacon signal detected by the signal-strength-detecting unit 214. Then, in the case where the strength is less than, for example, −63 dBm (0.00000005 mW) or equal to or greater than −30 dBm (0.001 mW), it is determined that the strength is not at the second level (step S108: NO).

On the other hand, the system-control unit 217 checks the strength (dBm) of the beacon signal detected by the signal-strength-detecting unit 214. Then, for example, when the strength is equal to or greater than −63 dBm (0.00000005 mW) and less than −30 dBm (0.001 mW), it is determined that the strength is at the second level (step S108: YES), and the process moves to step S112.
(Step S109)

The system control unit 217 determines whether or not the strength (dBm) of the beacon signal detected by the signal-strength-detecting unit 214 is at the second level.

In this case, the system-control unit 217 checks the strength (dBm) of the beacon signal detected by the signal-strength-detecting unit 214. Then, for example, when the strength is less than −63 dBm (0.00000005 mW) or equal to or greater than −30 dBm (0.001 mW), it is determined that the strength is not at the second level (step S109: NO).

On the other hand, the system-control unit 217 checks the strength (dBm) of the beacon signal detected by the signal-strength-detecting unit 214. Then, for example, when the strength is equal to or greater than −63 dBm (0.00000005 mW) and less than −30 dBm (0.001 mW), it is determined that the strength is at the second level (step S109: YES), and the process moves to step S110.
(Step S110)

The system-control unit 217 gives an instruction to request downloading of the remote operation app.

In this case, the system-control unit 217 instructs the communication-control unit 211 to request downloading of the remote operation app from the Web page indicated by the URL included in the beacon signal.
(Step S111)

The system-control unit 217 determines whether downloading of the remote operation app has been completed.

In this case, when there is no notification from the communication-control unit 211 indicating the completion of the download, the system-control unit 217 determines that downloading of the remote operation app has not been completed (step S111: NO).

On the other hand, when there is a notification from the communication-control unit 211 indicating the completion of the download, the system-control unit 217 determines that downloading of the remote operation app has been completed (step S111: YES), and the process moves to step S112.

At this time, the system-control unit 217 installs the downloaded remote operation app.
(Step S112)

The system-control unit 217 causes a setting screen to be displayed on the panel unit 202.

In this case, the system-control unit 217 activates the remote operation app, and, according to the procedure of the remote operation app, and via the panel-operation-control unit 216, causes the panel unit 202 to display contents prompting setting of function selection and the like of the MFP 100.

In addition, the system-control unit 217 causes the panel-operation-control unit 216 to receive the setting contents.
(Step S113)

The system-control unit 217 determines whether or not the panel-operation control unit 216 has received the setting contents.

In this case, when there is no notification indicating that the setting contents have been received from the panel-operation-control unit 216, the system-control unit 217 determines that the panel-operation-control unit 216 has not received the setting contents (step S113: NO).

On the other hand, when there is a notification indicating that the setting contents have been received from the panel-operation-control unit 216, the system-control unit 217 determines that the panel-operation-control unit 216 has received the setting contents (step S113: YES), and the process moves to step S114.
(Step S114)

The system-control unit 217 determines whether or not the strength (dBm) of the beacon signal detected by the signal strength detection unit 214 is at the third level.

In this case, the system-control unit 217 checks the strength (dBm) of the beacon signal detected by the signal strength detection unit 214, and in the case where the strength is less than, for example, −30 dBm (0.001 mW), the system-control unit 217 determines that the strength is not at the third level (step S114: NO).

On the other hand, the system-control unit 217 checks the strength (dBm) of the beacon signal detected by the signal strength detection unit 214, and in the case where the strength is equal to or greater than, for example, −30 dBm (0.001 mW), the system-control unit 217 determines that the strength is at the third level (step S114: YES), and the process moves to step S115.
(Step S115)

The system-control unit 217 gives an instruction to transmit the setting contents received by the panel-operation-control unit 216.

In this case, the system-control unit 217 gives an instruction to the communication-control unit 211 to transmit the setting contents received by the panel-operation-control unit 216.

In other words, for example, it is presumed that the setting contents are transmission of printing data and a printing instruction. In this case, the system-control unit 217, via the communication-control unit 211, transmits the printing data specified by the MFP 100. In addition, in the case where the setting contents include setting information such as the number of printed sheets, monochrome printing or color printing, font size, and the like, the system-control unit 217, via the communication control unit 211, transmits this setting information to the MFP 100.

At this time, the MFP 100 side instructs the image-processing unit 117, the printer-control unit 111, and the like to start printing.

As described above, in the present embodiment, the MFP 100 (electronic apparatus) transmits radio waves with a fixed output, the portable terminal 200 receives radio waves, and corresponding to change in the strength of the radio waves according to the distance to the MFP 100 (electronic apparatus), confirms whether or not a remote operation app corresponding to the MFP 100 (electronic apparatus) is installed, and in the case where a remote operation app is not installed, downloads a remote operation app corresponding to the MFP 100 (electronic apparatus). As a result, it is possible to automatically download a remote operation app corresponding to the MFP 100 (electronic apparatus) in accordance with the change in the strength of the radio waves according to the distance to the MFP 100 (electronic apparatus), and update the remote operation app unconsciously, so that it is possible to easily manage the remote operation app. Incidentally, a remote operation app compatible with the MFP 100 (electronic apparatus) means an application that conforms to the model of the MFP 100 (electronic apparatus), the version of the firmware, and the like and causes no problem during use.

Figure 4:
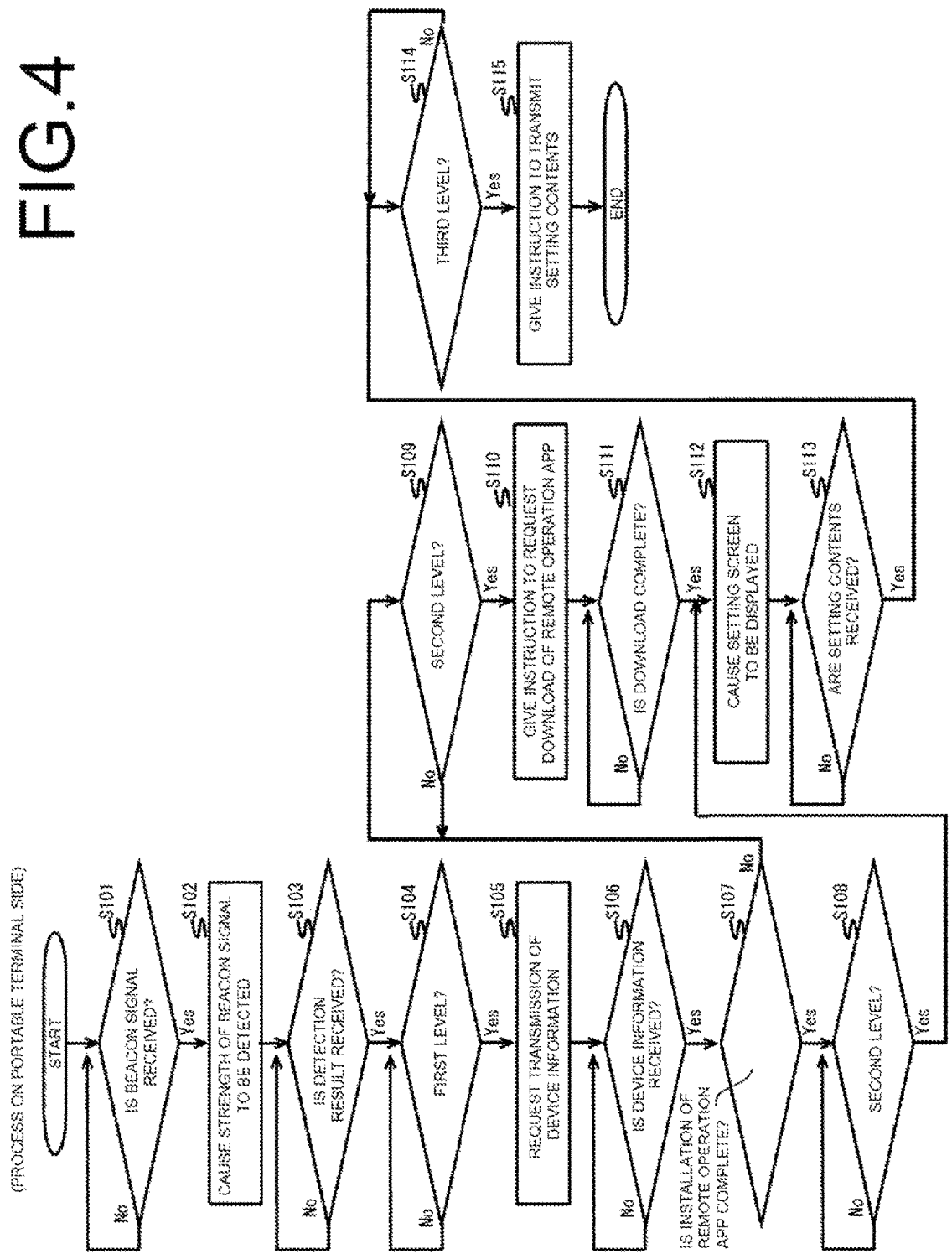
FIG. 4 is a flowchart for explaining a process such as installing a remote-operation application or the like on the portable-terminal side in FIG. 2.

Note that in step S108 illustrated in FIG. 4, the system-control unit 217 checks the strength (dBm) of the beacon signal detected by the signal-strength detecting unit 214, and when it is determined that the strength is at the second level or the third level, the process may move to step S112. Moreover, in step S109 illustrated in FIG. 4, the system-control unit 217 checks the strength (dBm) of the beacon signal detected by the signal-strength detecting unit 214, and when it is determined that the strength is at the second level or the third level, the process may move to step S110. This takes into consideration that during the period from step S105 to step S107, the user passes the range corresponding to the second level and enters the range corresponding to the third level.

Moreover, in the present embodiment, the case has been described in which the electronic apparatus is applied to a MFP 100, however the electronic apparatus may be applied to other image forming apparatuses such as a multifunction printer, and the like. Furthermore, the electronic apparatus may also be applied to home appliances such as television (TV), or the like.

In a power supply control apparatus of the typical technique described above, correlation is given between the detection range of a moving object and the activation timing of an operated unit, so it is possible to activate the operated unit in accordance with the detection range of the moving body.

In the case where the detection method in a power supply control apparatus of this kind of typical technique is applied to the above-described image forming apparatus and a moving body can be detected in an arbitrary detection range, when the temperature of the fixing unit is increased to a specified value, it is not necessary to wait until the temperature of the fixing unit reaches the specified value.

Incidentally, a remote operation application (hereinafter referred to as a remote operation app) that is capable of remote operation is prepared in the image forming apparatus. Therefore, by installing this remote operation app on a portable terminal such as a smartphone or the like beforehand, it is possible to remotely operate any one of the above-described printing function, copy function, FAX function, scanner function, and data transmitting/receiving function via a network that are provided in the image forming apparatus.

However, even in the case where the remote operation app is installed in the portable terminal, when the model of the image forming apparatus is different or the version of the firmware is different, there may be cases in which the remote operation of the image forming apparatus will not be able to be performed. In this case, there is a problem in that it is necessary to consciously update the remote operation app in advance, and management of the remote operation app is troublesome.

With the installation system and the recording medium according to the present disclosure, it is possible to automatically download a remote operation application corresponding to an electronic apparatus in accordance with a change in strength of radio waves corresponding to the distance to the electronic apparatus. Therefore, since it possible to update the remote operation application unconsciously, it is possible to easily manage the remote operation application.

What is claimed is:

1. An installation system comprising:
an electronic apparatus that transmits radio waves at a fixed output; and
a portable terminal that includes:
an antenna that receives the radio waves;
a signal-strength-detecting unit that detects strength of the received radio waves; and
a system-control unit that determines, from a plurality of levels, to which level the strength of the received radio waves detected by the signal-strength detecting unit corresponds, wherein the plurality of levels comprise a first level, a second level that is greater than the first level, and a third level that is greater than the second level;
wherein
the radio waves include first access information for the electronic apparatus and second access information of a web page for downloading a remote control application; and
the system-control unit,
when the detected strength is determined to be at the first level, receives the first access information from the electronic apparatus, requests the electronic apparatus to transmit device information of the electronic apparatus based on the received first access information, receives the device information of the electronic apparatus from the electronic apparatus and confirms whether or not a remote operation application corresponding to the device information is installed in the portable terminal,
when the detected strength is determined to be at the second level after the detected strength was previously determined to be at the first level, when the remote operation application is not installed, downloads and installs the remote operation application from the web page indicated by the second access information, and
when the detected strength is determined to be at the third level, transmits setting contents of remote operation according to a procedure of the remote operation application to the electronic apparatus.

2. The installation system according to claim 1 wherein the portable terminal, when the strength is determined to be at the second level, activates the installed remote operation application, and receives setting contents of the remote operation.

3. A non-transitory computer-readable recording medium that stores an executable installation program in a computer that controls an installation system; and when executing the installation program, the computer,
by an electronic apparatus, transmits radio waves at a fixed output; and
by a portable terminal that includes an antenna, a signal-strength-detecting unit, and a system control unit,
receives the radio waves using the antenna;
detects strength of the received radio waves using the signal-strength-detecting unit; and
using the system control unit, determines, from a plurality of levels, to which level the strength of the received radio waves detected by the signal-strength detecting unit corresponds, wherein the plurality of levels comprises a first level, a second level that is greater than the first level, and a third level that is greater than the second level; and
wherein
the radio waves include first access information for the electronic apparatus and second access information of a web page for downloading a remote control application; and
the system-control unit,
when the detected strength is determined to be at the first level, receives the first access information from the electronic apparatus, requests the electronic apparatus to transmit device information of the electronic apparatus based on the received first access information, receives the device information of the electronic apparatus from the electronic apparatus and confirms whether or not the remote operation application corresponding to the device information is installed,
when the detected strength is determined to be at the second level after the detected strength was previously determined to be at the first level, when the remote operation application is not installed, downloads and installs the remote operation application from the web page indicated by the second access information, and
when the detected strength is determined to be at the third level, transmits setting contents of remote operation according to a procedure of the remote operation application to the electronic apparatus.

* * * * *